Dec. 8, 1942.  E. G. DYBALL  2,304,155
JOINT WASHER
Filed Jan. 23, 1942

INVENTOR
Ernest G. Dyball
BY
ATTORNEY

Patented Dec. 8, 1942

2,304,155

UNITED STATES PATENT OFFICE 2,304,155

JOINT WASHER

Ernest George Dyball, Hove, England

Application January 23, 1942, Serial No. 427,993
In Great Britain April 10, 1941

5 Claims. (Cl. 85—50)

Joint washers or connector plates employed in forming wooden joints comprise metal plates provided with teeth at their edges which project in opposite directions from the surface of the plate so that they penetrate the wooden members to be connected when the same are forced together by bolts, screws or the like.

The main object of the present invention is to provide an improved joint washer with teeth projecting from one surface thereof which is particularly adapted for employment in the connection of wooden members to metal members, such as for example, in the connection of steel fish plates, anchors and gussets to wooden beams.

Another object of the invention is to provide a blank comprising a stamping of special formation for the manufacture of the improved joint washers.

A further object of the invention is to provide a novel method of manufacturing such washers from the stamped-out blanks.

As will hereinafter appear a joint washer according to the invention is formed with triangular peripheral notches, separated by triangular portions, and with triangular teeth projecting from one surface of the washer which are integral with edges of the triangular portions, the edges of the notches, of the triangular portions and of the teeth being all straight.

This joint washer is made from a blank comprising an annular stamping having ratchet-like peripheral spaced teeth of substantially triangular form with one short edge and one long edge, the short edge being radial.

In manufacture the points of the ratchet teeth of the blank are bent up, all on one surface of the blank, along lines running from the roots of the radial short edges of the teeth to medial points along the long edges of the teeth. The contours of the long edges of the teeth of the blank are formed by two lines making an obtuse angle with one another and the line along which the teeth are bent over joins the roots of the radial edges of the teeth with the intersections of the two lines defining the contour of the long edges of the teeth.

Figure 1:
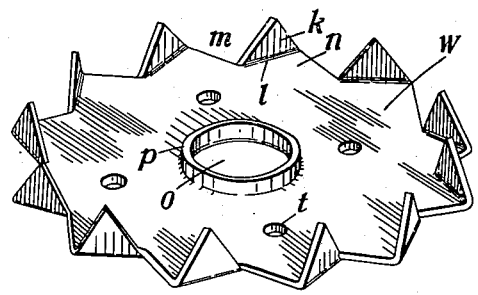
Figure 2:
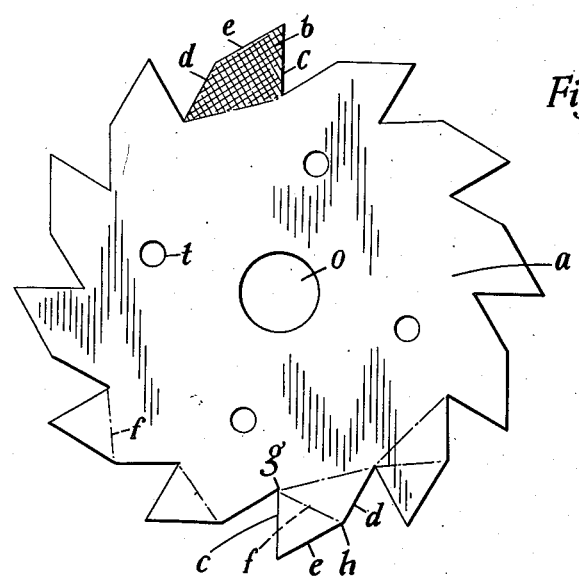

In the accompanying drawing, in which similar reference characters relate to like parts in all the figures, Figure 1 is a perspective view of a joint washer according to the invention and Figure 2 a view in elevation of the blank from which the same is formed.

Figure 3:
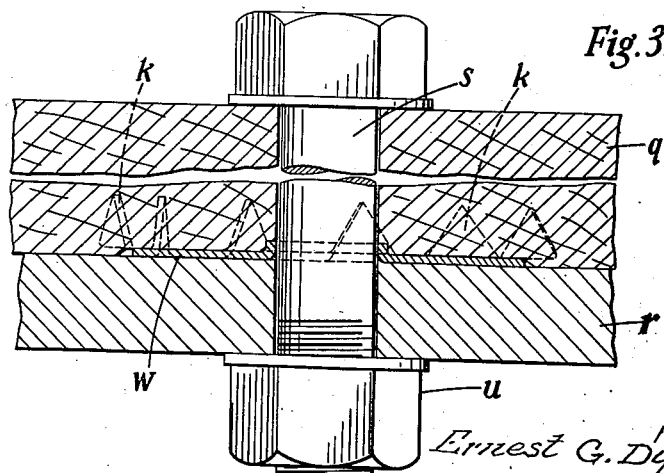

Figure 3 is a sectional view to show the application of the joint washer to a wood-metal joint.

Referring first to Figure 2 of the drawing it will be seen that the blank from which the joint washer is formed comprises an annular stamping $a$ with ratchet-like teeth equally spaced around its periphery. Referring to the particular tooth $b$ which is cross-hatched in order to more clearly show the configuration, it will be seen that the teeth are of trapeziform with one short edge $c$ and one long edge formed by the two edges $d$ and $e$ making an obtuse angle with one another. In the formation of a joint washer from a blank $a$ the points of the ratchet teeth are bent over, all on one surface of the blank, along the lines $f$ which run from the roots $g$ of the radial short edges $c$ to the points of intersection $h$ of the edges $e$ and $d$ defining the contour of the long edges of the teeth. This operation results in the toothed washer plate $w$, shown in perspective view in Figure 1, with triangular teeth $k$, all projecting from one surface of the washer, and triangular peripheral notches $m$ separated by triangular portions $n$. The teeth $k$ are integral with the edges $l$ of the triangular portions $n$ and the edges of the notches $m$, of the triangular portions $n$ and of the teeth $k$ are all straight.

In actual manufacture the blank $a$ may be stamped out and the points of the teeth bent over in the one operation or the blank $a$ may be stamped out in one operation and the points of the teeth bent up in a subsequent operation, by which also the marginal edge of the hole $o$ is pressed out to form the flange $p$.

Figure 3 shows the application of the improved joint washer to a wood-metal joint, that is to say, to the connection of a wooden member $q$ to a metal member $r$ on which it is superposed.

In practice the washer $w$ is applied to the wooden member $q$ with the points of the teeth $k$ in contact with its surface and the central aperture $o$ registering with the clearance holes in said members provided for the connecting bolt $s$. The washer is held temporarily in this position by means of nails driven through the holes $t$ provided in each of the washers and then by means of a mallet or the like the teeth $k$ are driven into the member $q$ until the body of the washer $w$ is more or less flush with its surface. The bolt $s$ is then threaded through and the two parts $q$ and $r$ forced together by tightening up the nut $u$.

What I claim is:

1. A joint washer having triangular peripheral notches, separated by triangular portions, and triangular teeth projecting laterally from one surface of the washer which are integral with edges of said triangular portions, the edges of said notches, of said triangular portions, and of said teeth being all straight.

2. A blank for the manufacture of a joint washer, comprising an annular stamping, the peripheral edge presenting individually spaced teeth in the general plane of the stamping, each tooth being of similar trapeziform shape, a short edge of which is radial of the stamping and a long edge of which has two angularly related portions, with one such portion forming with the short edge a substantially isosceles triangle, the base of which forms an acute angle with the base of the tooth as a whole.

3. A washer construction from the blank defined in claim 2, wherein an isosceles triangular portion of each tooth is bent into a plane normal to the general plane of the stamping.

4. A blank for the manufacture of a joint washer, comprising a stamping having a central hole and a continuous series of ratchet-like teeth round its periphery, said teeth being trapeziform in shape and lying in the plane of the stamping, one edge forming the root of the tooth, and an adjacent edge radial to the stamping forming the front of the tooth, the remaining edges defining an obtuse angle and forming the back of the teeth.

5. A blank for the manufacture of a joint washer, comprising a stamping having a central hole and a continuous series of ratchet-like teeth round its periphery, said teeth being trapeziform in shape and lying in the plane of the stamping, with two adjacent edges of equal length, one of which forms the front of the tooth and is radial to the stamping, and the other of which forms the adjacent back portion of the tooth, the remaining two adjacent edges forming the root of the tooth and the remaining portion of the back of the tooth respectively.

ERNEST GEORGE DYBALL.